ically preferred temperature in the process of the present invention ranges from about 250° F. (121° C.) to about 400° F. (204° C.). The hot melt adhesive produced by the process of this invention possesses excellent pressure sensitive adhesive properties.
United States Patent [19]
Jurrens

[11] 4,025,478
[45] May 24, 1977

[54] HOT MELT ADHESIVE

[75] Inventor: Lawrence D. Jurrens, Bartlesville, Okla.

[73] Assignee: Phillips Petroleum Company, Bartlesville, Okla.

[22] Filed: Feb. 7, 1975

[21] Appl. No.: 547,942

[52] U.S. Cl. .................... 260/27 R; 260/30.6 R; 260/878 R; 260/888
[51] Int. Cl.$^2$ ........................................ C08L 91/00
[58] Field of Search ............ 260/27 R, 878 B, 30.6, 260/887 R, 888

[56] References Cited

FOREIGN PATENTS OR APPLICATIONS

| 601,223 | 4/1948 | United Kingdom ............. 260/27 R |
| 958,425 | 5/1964 | United Kingdom ............. 260/27 R |
| 711,520 | 7/1954 | United Kingdom ............. 260/27 R |
| 844,141 | 8/1960 | United Kingdom ............. 260/27 R |

Primary Examiner—Melvyn I. Marquis
Assistant Examiner—William Parker

[57] ABSTRACT

A pressure sensitive hot melt adhesive formulation is provided that contains, as the sole adhesive component, a solid polybutadiene which has been produced from an unhydrogenated polybutadiene having a vinyl content of at least 50 percent and subsequently has been hydrogenated to a vinyl content of less than 15 percent. The hot melt adhesive formulation also contains a sufficient amount of a tackifier, preferably a hydrogenated rosin, to produce an adhesive formulation having a viscosity at 350° F. of from about 1,500 to about 1 million, preferably about 15,000 to about 350,000 cps. The formulation can also contain up to 5 percent by weight of the total combination of the polybutadiene and tackifier of heat and light stabilizing compounds.

12 Claims, No Drawings

HOT MELT ADHESIVE

BACKGROUND OF THE INVENTION

This invention relates to hot melt adhesive compositions. According to one aspect of this invention, it relates to hot melt adhesive compositions comprising a single adhesive component admixed with a sufficient amount of tackifier to permit proper function of the composition in the apparatus currently used in hot melt adhesive application. In another of its aspects this invention relates to pressure sensitive hot melt adhesive formulations. In a further aspect this invention relates to the use of hydrogenated polybutadiene as the adhesive constituent in hot melt adhesive formulations.

One of the more significant developments in adhesive technology in recent years has occurred in the area of hot melt adhesives. Growth in the use of hot melt systems has been particularly marked by various segments of the packaging, book binding, and shoe industries. Increased interest in hot melts has in turn encouraged development of special types of plastic resins to serve as base constituents in commercial formulations.

Polybutadiene has been considered as a possible base constituent for hot melt adhesives, but development of these polymers for hot melt adhesive application has been hampered because early testing of hydrogenated polybutadienes disclosed that the materials tested were not effectively adhesive. It has now been discovered that hydrogenated polybutadiene having a low vinyl content in the hydrogenated polymer is well suited as the adhesive constituent in hot melt adhesive formulations if the hydrogenated polymer is prepared from an unhydrogenated polybutadiene having a vinyl content of at least about 50 percent.

Other aspects as well as the several advantages in this invention will be apparent to those skilled in the art upon reading the specification and the appended claims.

In accordance with the invention, hot melt adhesive formulation useful particularly as pressure sensitive adhesives are prepared by hydrogenating an unhydrogenated polybutadiene having a vinyl content of at least 50 percent to produce a hydrogenated polybutadiene having a vinyl content of less than about 15 percent and incorporating with this polymer a sufficient amount of a tackifying compound to produce a formulation having a viscosity to give an adequate performance in hot melt adhesive application equipment. In general, a suitable viscosity range for performance of a hot melt adhesive can be stated as about 1,500 to about 1 million, preferably about 15,000 to about 350,000 cps at a temperature of 350° F.

Polybutadienes suitable for use in this invention are made by polymerizing 1,3-butadiene using a suitable catalyst such as an alkali metal alkyl and modifiers to produce high vinyl polybutadienes by a method such as set forth in copending application Ser. No. 488,995, filed July 16, 1974. The polymers thus produced range from liquids to rubbery products having a variable content of cis, trans and vinyl unsaturation as determined from infra-red data. In general, solid polybutadienes having a vinyl content of 50-95 percent which can be hydrogenated to a double bond content of less than 15 percent, preferably less than 10 percent, are suitable. It is preferred that the vinyl content of the parent polybutadiene is between 60 and 90 percent. While a vinyl content of 100 percent is theoretically possible and is considered operable for the purposes of this invention, it is considered that there is a practical limitation of 95 percent vinyl content of the unhydrogenated rubber with economic considerations reducing the upper limit of vinyl content to 90 percent.

The butadiene polymers most suitable for this invention can be defined as having at least one long chain branch per polymer molecule. It is realized that because of the method employed in preparing the branched high vinyl polymers, the final polymer product may contain a small amount of linear or unbranched base polymer, and linear coupled base polymer. The branched high vinyl polymer is therefore described as a polymer which has on the average at least one long chain branch per polymer molecule. The branched high vinyl polymer is formed from the coupling or joining of, on the average, more than two base polymer molecules resulting in a radial polymer having, preferably, a majority, i.e., more than 50 percent, of branched polymer chains.

Branched or radial high vinyl polybutadiene, i.e., polybutadiene having high side-chain unsaturation, for example, can be prepared by first forming a high vinyl base polymer of butadiene having one or two terminally reactive alkali metal atoms per base polymer molecule. The terminally reactive high vinyl base polymer is then reacted with a coupling or joining agent capable of joining, on the average, more than two base polymer molecules in an essentially end-to-end arrangement.

Suitable initiators for the formation of the terminally reactive high vinyl base polymer are based on alkali metal or organic compounds thereof and are of two general types. Type I initiators comprise the alkali metals, other than lithium, and their hydrocarbyl derivatives, or adducts of these metals with condensed ring aromatic hydrocarbon, or mixtures thereof. Examples of suitable Type I initiators include finely divided sodium metal, n-amylsodium, phenylpotassium, potassium naphthalene adduct, butylcesium, rubidium metal, sodium naphthalene adduct and the like. Type II initiators comprise lithium, lithium hydrocarbyl compounds, or lithium adducts with condensed ring aromatic hydrocarbons in conjunction with an effective amount of vinyl promoter.

A vinyl promoter is a compound which promotes, for example, 1,2-addition in the polymerization of butadiene. The vinyl promoters useful with the above lithium-based initiators are selected from the group consisting of nonreactive polar organic compounds such as ethers, thioethers, tertiary amines, and the alkali metals such as sodium, potassium, rubidium, cesium, or organic compounds thereof. Examples of preferred vinyl promoters include tetrahydrofuran (THF), 1,3-dioxane, triethylamine, N,N,N',N'-tetramethylethylenediamine (TMEDA), potassium tert-butoxide, and potassium tert-amyloxide.

Specific examples of polar materials which are vinyl promoters include dimethyl ether, diethyl ether, ethylmethyl ether, ethylpropyl ether, di-n-propyl ether, di-n-octyl ether, dibenzyl ether, diphenyl ether, anisole, dimethylsulfide, diethylsulfide, tri-n-butylamine, trimethylamine, triethylamine, aniline, pyridine, quinoline, and the like. Further it is to be understood that mixtures of these polar compounds can be employed in the practice of the instant invention.

The amount of vinyl promoter employed with the Type II polymerization initiator depends on the vinyl content desired in the polybutadiene base and final polymers, and on the vinyl promoting effectiveness of the particular promoter employed. The vinyl promoting effectiveness of a particular promoter is, in turn, influenced by the temperature employed in the polymerization step. In general, the more vinyl promoter employed, the higher will be the vinyl content of the polybutadiene base and final polymers prepared with a Type II initiator. Examples of suitable Type II initiators and vinyl promoter combinations include n-butyllithium/THF, lithium metal/1,3-dioxane, sec-butyllithium/TMEDA, lithium metal/n-amylsodium, n-butyllithium/potassium tert-butoxide, sec-butyllithium/potassium tertamyloxide, phenyllithium/phenylpotassium and the like.

The high vinyl base polymer prepared with the initiators described above and having at least one terminally reactive alkali metal atom is then treated with a coupling or joining agent capable of joining or coupling, on the average, more than two of the base polymer molecules by reaction with the terminal alkali metal atom. In general, such coupling is preferably achieved by employing compounds having at least three reactive sites per molecule. Polyfunctional reagents having at least three reactive sites per molecule react with the alkali metal-carbon bond in the polymer thereby coupling the reagent to the polymer at this bond. For this reason, compounds containing active hydrogen atoms such as water, alcohol, acids and the likes, are to be avoided since such compounds replace the lithium atom with hydrogen and do not affect the desired coupling. It should be understood, however, that compounds containing relatively small amounts of active hydrogen can be used provided the reactive sites capable of producing coupling are present in sufficient quantity to offset the effect of the inactivation produced by the active hydrogen. Types of treating agents which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups or isocyanate and halide groups. In addition to these reagents, compounds such as divinylbenzene, carbon monoxide, carbon dioxide, and esters of dicarboxylic acids can also produce branched or radial high vinyl polybutadiene. The amount of coupling agent employed can vary but is generally sufficient to provide one equivalent of reactive coupling group per equivalent of terminally reactive alkali metal atom on the prepared base polymer.

The reaction conditions employed in the formation of the base polymer and in the coupling reaction are those known for conventional polymerization of, for example, butadiene with lithium-based initiators and a subsequent coupling reaction. Generally, an inert hydrocarbon diluent having from 4 to 10 carbon atoms per molecule is employed in such polymerizations. Temperatures of from $-100°$ to $200°$ C are conventional. Initiator amounts are generally in the range of from 0.25 to 100 milliequivalents of alkali metal in the initiator per 100 grams of butadiene.

Recovery of the coupled, radial or branched high vinyl polybutadiene can be conventionally accomplished, for example, by steam stripping, alcohol coagulation, diluent evaporation, and the like. An antioxidant can be added to the polymer in a reaction mixture containing the polymer prior to the recovery step.

Hydrogenation of the base polymer can be effected by any of the known methods of hydrogenating high vinyl-containing polymers. It has been effective for the purpose of this invention to continuously hydrogenate the polybutadiene in packed, jacketed columns at a temperature within the range of about $355°-380°$ F. using as a catalyst a solution comprising nickel octoate and triethyl aluminum and cyclohexane. Such hydrogenation methods are known in the art and are not per se part of this invention. The hydrogenated polymers having a vinyl content of no more than about 15 percent and preferably less than 10 percent can be recovered by treatment of the hydrogenation effluent with ammonium phosphate to remove the catalyst solids by filtering, steam stripping, and drying as set forth in U.S. Pat. No. 3,531,448.

To produce a hot melt adhesive operative in equipment currently in use hydrogenated polybutadiene must be mixed with a sufficient amount of a tackifying compound to produce a formulation having a viscosity in a range operable with current equipment. The tackifying compound can be chosen from among those compounds commonly used in the art as tackifiers. Especially useful with the polybutadienes in producing formulations according to the process of this invention are pentaerythritol esters of hydrogenated rosin, synthetic polyterpenes, thermoplastic olefins, and tall oil rosins, among others. The tackifier is incorporated into the formulation with the polybutadiene so that from about 30 to about 65 percent by weight of the total composition of the two components is tackifier. The preferred amount of tackifier within this range is chosen so that the viscosity of the adhesive formulation at $350°$ F. is within the range of about 1,500 to about 1 million cps. It is preferable that the amount of tackifier in the formulation yield a viscosity at $350°$ F. in the range of about 15,000 to about 350,000 cps, because, even though machinery is available that will handle viscosity toward the upper end of the range, performance of the adhesive is generally better toward the lower end of the broad range.

The polybutadiene and tackifier can be blended by any convenient method known in the art for melt blending tackifiers into adhesive compositions. One well-known method comprises stirring of one of the materials into a melted batch of the other material using a mixer to assure adequate agitation for complete dispersion of one material within the other.

By the process of this invention minor amounts of stabilizing compounds compatible with polybutadiene and the tackifiers can be added to the formulation in amounts of up to about 5 weight percent of the mixture of the tackifier and polybutadiene. Such heat stabilizing materials as dilaurylthiodipropionate and alkylated-arylated bis-phenolic phosphite are particularly suitable as thermoplastic stabilizing compounds.

The adhesive formulations produced by the process of this invention have the desirable attributes of good heat stability and the development of less color on prolonged heating as compared to many of the hot melt adhesive formulations currently commercially available. These desirable properties result in a long pot life for extended glueing operations such as carton sealing. These properties are commercially in demand, particularly in the area of pressure sensitive hot melt adhesives.

The hot melt adhesive formulation of this invention and the process of preparing it are illustrated by the following examples which are meant to be exemplary and not exclusive.

EXAMPLE I

Preparation of High Vinyl Polybutadiene
A 20 gallon reactor was used for each batch. The charge comprised:

| | |
|---|---|
| Cyclohexane | 800 parts by weight |
| Butadiene | 100 |
| Butyl lithium | Variable |
| Tetrahydrofuran (THF) | Variable |
| Tetramethylethylenediamine (TMED) | Variable |

The polymerizations were carried out adiabatically with the initiation temperature at 120° F. The ingredients were charged in the order: cyclohexane, THF or TMED, butadiene, butyllithium. The run was terminated when all of the butadiene had been polymerized.

HYDROGENATION OF HIGH VINYL POLYBUTADIENE

Hydrogenation was carried out continuously in a 2 inch jacketed column, packed with 6 ft. of ½ in. beryl saddles, with a feed rate of 4.5 lbs. polymer/hr. (as a solution in cyclohexane containing 10.4 wt. % solids) at a temperature between 355°–380° F. The catalyst is a solution comprising the following:

| | |
|---|---|
| Nickel octoate, 6% by wt. in cyclohexane | 7.5 wt. % |
| Triethyl aluminum, 23% by wt. in cyclohexane | 5.1 wt. % |
| Cyclohexane | 87.4 wt. % |

The catalyst solution was fed to the hydrogenation reactor at a rate of about 20 to about 60 ml/minute.

The hydrogenated polymers in cyclohexane were treated with ammonium phosphate to remove the catalyst, filtered, steam stripped and dried.

The polymerization runs and product properties are summarized in the table below.

TABLE I
Preparation and Properties of Hydrogenated High Vinyl Polybutadiene

| No. | Parts by wt. BuLi Charged | THF or TMED[4] | Rate of Hydrogenation Catalyst Addition ml/min. | Properties of Unhydrogenated Polymer | | | | Properties of Hydrogenated Polymer | | | |
|---|---|---|---|---|---|---|---|---|---|---|---|
| | | | | % Trans | % Vinyl | Mooney[1] ML-4 | $M_w/M_n$[2] $\times 10^{-3}$ | % Trans | % Vinyl | Mooney ML-4 | $M_w/M_n$ $\times 10^{-3}$ |
| | 0.11 | THF 1.5 | 40.8 | 40.1 | 27.4 | — | 45/40 | 0.6 | 0.8 | 10 | 76/47 |
| | 0.11 | TMED 0.1 | 40.8 | 30.2 | 46.0 | 4 | 70/61 | 3.7 | 0.7 | 9 | 82/56 |
| | 0.11 | TMED 0.2 | 61.2 | 19.2 | 61.2 | 3 | 104/81 | 11.8 | 0.9 | 3 | 75/57 |
| (3) | 0.44 | TMED 0.1 | 20.4 | 21.7 | 63.4 | 64 | 261/204 | 4.7 | 0.2 | 27 | 291/96 |
| | 0.11 | TMED 0.4 | 40.8 | 16.5 | 68.9 | 4 | not measured[3] | 6.9 | 0.8 | 3 | 95/60 |

[1]Mooney ML-4 at 212° F.
[2]$M_w$ — weight average molecular weight $M_n$ — number average molecular weight
[3]This product has a higher Mooney and higher molecular weight value than the other runs. These differences are reflected in the viscosity behavior of the adhesives formulated from this product (see below).
[4]THF — Tetrahydrofuran; TMED — Tetramethylethylenediamine

EXAMPLE OF PREPARATION OF HOT MELT ADHESIVE

Equal parts by weight of hydrogenated polybutadienes of varying original vinyl content and a tackifier, the pentaerythritol ester of hydrogenated rosin (Hercules, Inc.) were melt blended with stirring in a mixer. All samples contained 2 wt. %, based on total weight of polymer and tackifier, of an alkylated-arylated bisphenolic phosphite (Agerite Geltrol, Vanderbilt, Co.) and 0.50 wt. %, also based on total weight of polymer and tackifier of dilaurylthiodipropionate (DLTDP) as stabilizers.

The hot melt adhesives were tested for adhesion (called tack) immediately after blending and after 24 hrs. at room temperature (RT) and after 24, 72 and 168 hours of aging at 158° F. Viscosities were also measured at 350° F immediately after blending and after aging at 350° F for 24 hours. The results are tabulated below:

TABLE II

| Polybutadiene Original Vinyl % | Tack Response, [1]g. Time hrs. | | | | | Viscosity[2] 350° C, cps | |
|---|---|---|---|---|---|---|---|
| | 0 RT[3] | 24 | 24 158° F | 72 | 168 | immediate | after 24 hrs. at 350° F |
| 27.4 | 0 | 0 | 50 | 50 | 40 | 203,000 | 166,250 |
| 46.0 | 967 | 530 | 827 | 660 | 773 | 72,500 | 83,400 |
| 61.2 | 1343 | 896 | 1013 | 1170 | 1243 | 15,500 | 13,200 |
| 63.4 | 1303 | 920 | 1180 | 1165 | 1120 | [4] | (500,000) not measured |
| 68.9 | 1426 | 1560 | 1187 | 1416 | 1550 | 19,000 | |

[1]Tack tests were made on a "Polyken Probe Tack Tester" (Testing Machines, Inc., Mineola, N.Y.) according to the instructions in the operating manual using a 2 mil Mylar tape. (Method by Hammond, ASTM Bulletin 360 (1965).
[2]Viscosity measurements were made on a Brookfield Thermosel Viscometer using spindle size 4-27.
[3]Room temperature.
[4]Too high to measure on instrument used.

The data show that as the vinyl bond content of the parent polybutadiene increases, the tack response also increases. An initial tack value of about 1,000 g. is considered adequate for most applications. This value is approached at a vinyl content of 46.0 and is well exceeded when the vinyl bond content is above 60. The heat stability of the formulations according to the invention is also satisfactory as shown by the viscosity measurement which does not change materially after heating at 350° F. for 24 hours. This is an important consideration since hot melt adhesives must be capable of being kept at liquid temperature for at least a full day of operation.

The sample based on 63.4% vinyl content polybutadiene had an exceptionally high viscosity at 350° F. which exceeded the practical limits of the instrument.

I claim:
1. A hot melt adhesive composition comprising
   1. a solid polybutadiene having vinyl content of less than 15 percent which has been produced from an unhydrogenated polybutadiene having a vinyl content of at least 50 percent by subsequent hydrogenation and
   2. an amount of a tackifying compound sufficient to produce an adhesive composition having a viscosity at 350° F. of from about 1,500 to about 1 million cps.
2. An adhesive composition of claim 1 wherein the tackifier is chosen from among the pentaerythritol esters of hydrogenated rosin, synthetic polyterpenes, thermoplastic olefins, and tall oil rosins.

3. A hot melt adhesive composition of claim 1 wherein the vinyl content of the unhydrogenated polybutadiene is in the range of about 60 to about 90 percent.

4. A hot melt adhesive composition of claim 2 wherein the tackifier is present in the range of about 30 to about 65 percent by weight of the total of the tackifier and polybutadiene mixture.

5. A hot melt adhesive composition of claim 1 wherein stabilizing compounds are present in the adhesive formulation in amounts up to about 5 percent by weight of the total mixture amount of tackifier and polybutadiene.

6. A hot melt adhesive composition of claim 5 wherein the adhesive comprises
   1. about equal parts by weight of (a) polybutadiene and (b) the pentaerythritol ester of hydrogenated rosin and
   2. stabilizers comprising (a) about 2 percent by weight of an alkylated-arylated bis-phenolic phosphite and (b) about 0.5 percent by weight of dilaurylthiodipropionate.

7. A method for preparing a hot melt adhesive formulation comprising preparing a solid polybutadiene having a vinyl content of at least 50 percent, hydrogenating said polymer to produce a hydrogenated polybutadiene having a vinyl content of less than 15 percent and incorporating into the hydrogenated polybutadiene an amount of a tackifying compound sufficient to produce an adhesive composition having a viscosity at 350° F. of from about 1,500 to about 1 million cps.

8. A method according to claim 7 wherein the tackifier is chosen from among the pentaerythritol esters of hydrogenated rosin, synthetic polyterpenes, thermoplastic olefins, and tall oil rosins.

9. A method according to claim 7 wherein the vinyl content of the unhydrogenated polybutadiene is in the range of about 60 to about 90 percent.

10. A method according to claim 8 wherein the tackifier is present in the range of about 30 to about 65 percent by weight of the total of the tackifier and polybutadiene mixture.

11. A method according to claim 7 wherein stabilizing compounds are present in the adhesive formulation in amounts up to about 5 percent by weight of the total mixture amount of tackifier and polybutadiene.

12. A method according to claim 11 wherein the adhesive comprises
   1. about equal parts by weight of (a) polybutadiene and (b) the pentaerythritol ester of hydrogenated rosin and
   2. stabilizers comprising (a) about 2 percent by weight of an alkylated-arylated bis-phenolic phosphite and (b) about 0.5percent by weight of dilaurylthiodipropionate.

* * * * *